United States Patent [19]

Egner-Walter

[11] Patent Number: 5,349,719
[45] Date of Patent: Sep. 27, 1994

[54] YOKE FOR WIPER ARM

[76] Inventor: Bruno Egner-Walter, Kaferflugstr. 43, 7100 Helbronn, Fed. Rep. of Germany

[21] Appl. No.: 857,915

[22] Filed: May 15, 1992

[30] Foreign Application Priority Data

Sep. 15, 1990 [DE] Fed. Rep. of Germany ....... 4029343

[51] Int. Cl.$^5$ .............................. B60S 1/32; B60S 1/46
[52] U.S. Cl. .................................. 15/250.35; 15/250.04
[58] Field of Search ........... 15/250.35, 250.04, 250.20, 15/250.18, 250.01, 250.36, 250.40, 250.41

[56] References Cited

U.S. PATENT DOCUMENTS

| 2,094,732 | 10/1937 | Anderson | 15/250.35 |
| 3,339,222 | 9/1967 | Bock et al. | 15/250.35 |
| 3,548,442 | 12/1970 | Stratton | 15/250.35 |
| 3,827,101 | 8/1974 | Wubbe | 15/250.04 |
| 4,133,071 | 1/1979 | Jaske | 15/250.04 |
| 4,947,508 | 8/1990 | Bauer et al. | 15/250.35 |

FOREIGN PATENT DOCUMENTS

| 2105774 | 9/1971 | Fed. Rep. of Germany ... 15/250.35 |
| 2756991 | 5/1979 | Fed. Rep. of Germany . |
| 3530108 | 12/1986 | Fed. Rep. of Germany ... 15/250.20 |
| 3907968 | 9/1990 | Fed. Rep. of Germany ... 15/250.04 |
| 4110648 | 10/1991 | Fed. Rep. of Germany ... 15/250.20 |
| 1295138 | 6/1962 | France . |
| 2263915 | 10/1975 | France . |
| 61-14159 | 1/1986 | Japan ............................... 15/250.20 |
| 241859 | 9/1990 | Japan ............................... 15/250.20 |

Primary Examiner—Timothy F. Simone
Assistant Examiner—Gary K. Graham
Attorney, Agent, or Firm—Robert P. Seitter; J. Gordon Lewis

[57] ABSTRACT

This invention relates to a wiper arm with a hose for washing liquid guided through a pressure spring, with a yoke connecting the pressure spring with a fastening member of the wiper as well as with a hose member that juts out of the pressure spring and extends in the direction of the yoke.

The mid-portion part which is arranged between the two end parts of the yoke is collaterally located at the hose member.

13 Claims, 2 Drawing Sheets

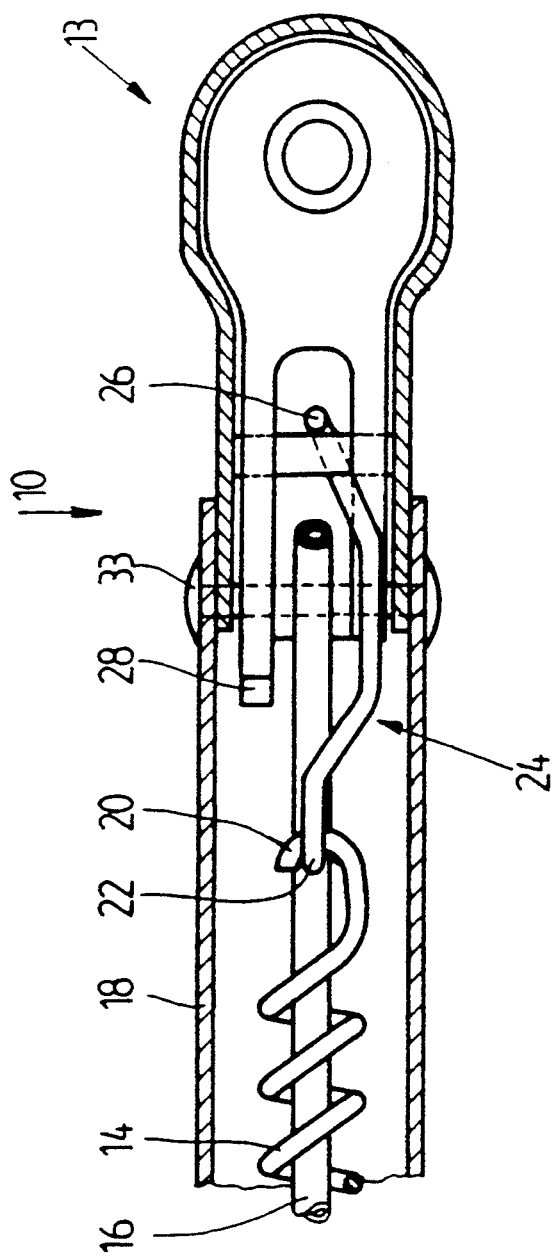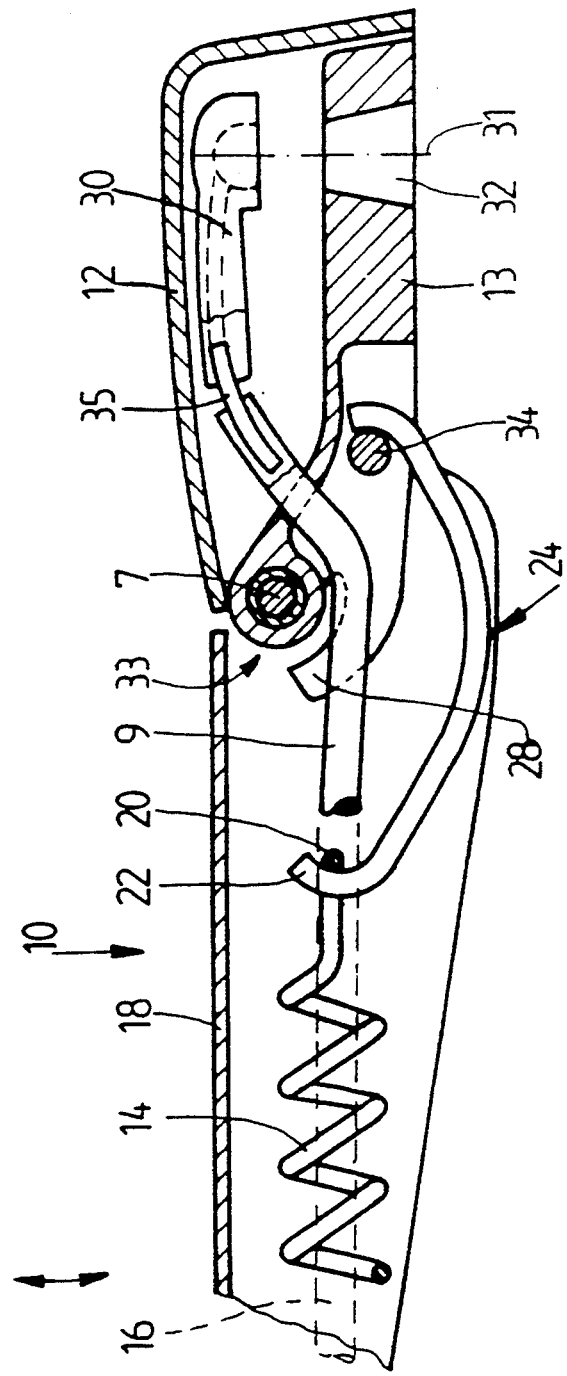

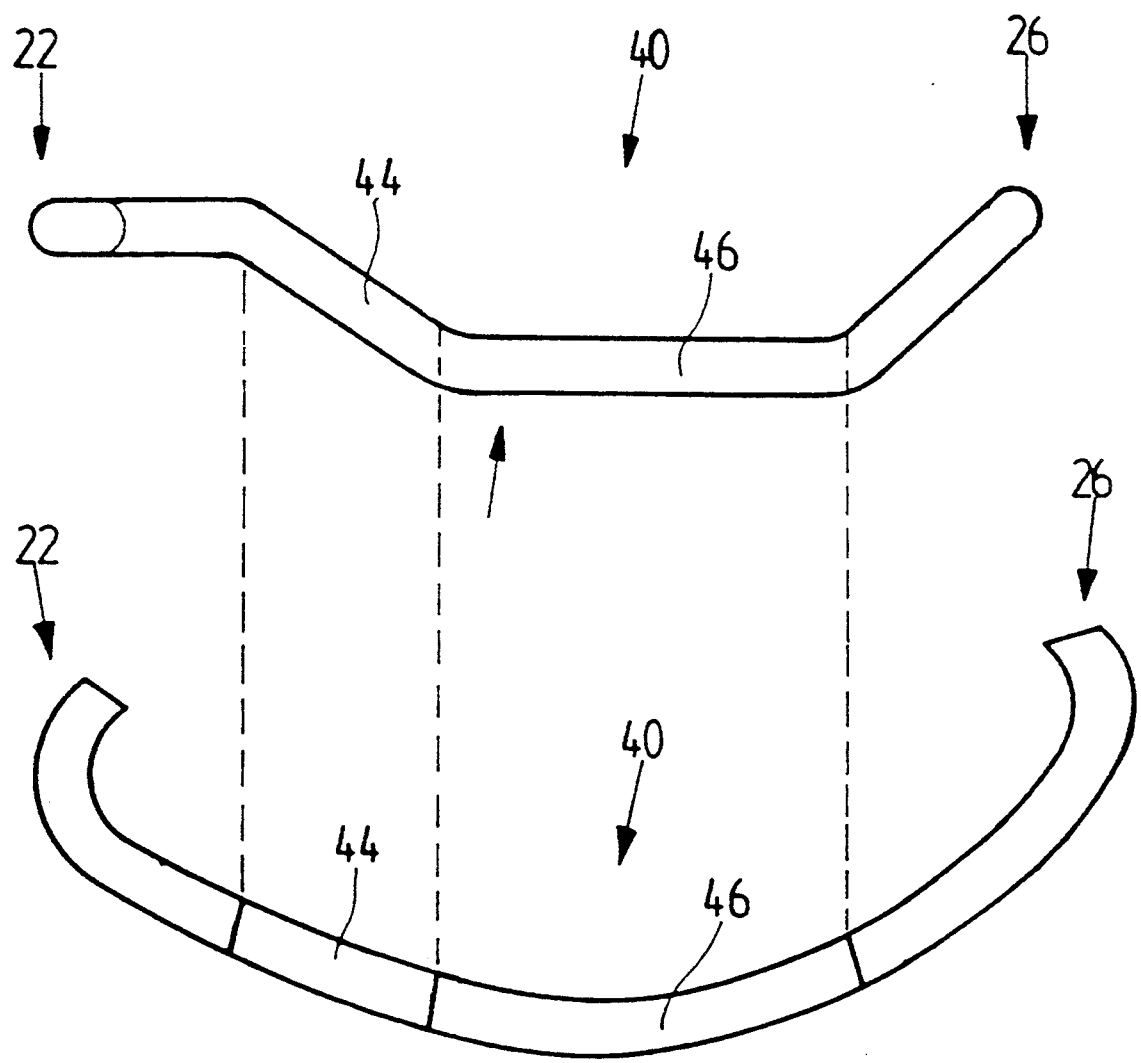

YOKE FOR WIPER ARM

BACKGROUND OF THE INVENTION

This invention concerns a wiper arm with a hose for washing liquid guided through a pressure spring, with a yoke connecting the pressure spring with a fastening member of the wiper arm as well as with a hose member which juts out of the pressure spring and extends in the direction of the yoke.

In known wiper arms as above mentioned and e.g. DE-AS 27 56 991 described, the hose is guided in the pressure spring. The pressure spring and the fastening member are connected by a C-yoke, which may squeeze the hose by swiveling the link and cause damage. On the other hand it is also to be desired with respect to those wiper arms to minimize the interior height and width of the link, but still to guarantee a functional arrangement of the pressure spring and the hose.

Originating from the above prior art the object of this invention is to develop the generic wiper arm in such a way that in case of little interior height and width the hose is perfectly installed in the wiper arm.

SUMMARY OF THE INVENTION

This object is achieved according to the invention by arranging the medium part or mid-portion of the yoke which is arranged between the end parts of the yoke above and/or collaterally to the hose member.

This invention is based on the idea that a functional arrangement of the hose member is possible, if one deviates from the standard C-yokes and deforms the medium part, which is arranged between both end parts, in such a way that, when swiveling the link, it does not touch the hose member. This also excludes that the hose member is damaged by the yoke. The fundamental idea of this particular invention can be realized in different ways. The mid-portion part can be arc-shaped or multiply crimped so that it is arranged collaterally to the hose, that is in each operating position of the link.

Further useful and favorable embodiments of this invention are to be taken from the subclaims.

A particularly useful embodiment provides that the medium part ends in the hook-shaped end parts. Here it is useful, if the free ends of the hooks are aligned towards the deck side of the link of the wiper arm. By these measures it is possible to produce the yoke with the pressure spring and the fastening member in a fairly simple manner.

A further useful embodiment provides that the hose member is connectable with a fitting in the fastening member. The link is linked to the fastening member because the linkage between the link and the fastening member is produced by means of a swiveling bearing. The link can be pivoted around an axis, in which area the wash water supply is arranged.

The fitting can be pivoted around the axis of the fastening member to secure that no relative motions will occur between the hose member and the fitting.

A further useful embodiment provides that the connection between the yoke and the fastening member can be made by means of a pin extending askew to the axis. The distance between the swiveling peg and the pin is hereby measured so that the hose member is arranged between the pin and the swiveling peg of the link. The hose member is made of elastic material and is partly deformed when swiveling the link, however not squeezed by the yoke so that a damage of the hose member does not occur.

A further useful embodiment of this invention provides that the hose member extends in the direction of the link and is approximately centrally arranged in the fastening member. Hereby it is suitable to use plug-in connection for connecting the fitting with the hose member. By this method a wiper arm can be achieved, in which the hose with the attached hose member is nearly axially arranged so that the interior height and-/or the interior width of the link can be minimized.

A further useful and particularly advantageous embodiment of this invention provides that the fastening member has only one horn which is laterally arranged to the longitudinal axis of the link. Thus an embodiment of a fastening member and a correspondingly shaped yoke is proposed, in which embodiment an optimal bedding of the hose member is given. A horn is taken off from the fastening member so that in this area a collaterally bent yoke, when being tilted, can be guided around the bearing. It is to be pointed out that the yoke can also integrally be formed with the pressure spring.

This invention also concerns a yoke for a wiper arm with a hose for wash liquid guided in a pressure spring, by which yoke the pressure spring is connectable with a fastening member of the wiper arm. The medium part arranged between both end parts of the yoke is arc-shaped or multiply crimped and collaterally arranged at the hose member which juts out of the pressure spring.

BRIEF DESCRIPTION OF THE DRAWINGS

The invention and advantageous embodiments thereof will be explained below by way of the attached drawings, in which:

FIG. 1 is the top view of a part of the wiper arm and partly a section thereof,

FIG. 2 is the side view of the wiper arm displayed in FIG. 1 and a section thereof, FIG. 3 is the top view of a yoke, and FIG. 4 is the side view of the yoke displayed in FIG. 3.

DETAILED DESCRIPTION OF THE DRAWINGS

The standard wiper arms according to FIGS. 1 and 2 usually require a link 18 swivelably mounted on a fastening member 13. To generate the necessary pressure, a pressure spring 14 is provided in this known wiper arm. The pressure spring is, on the one hand, connectable with a wiper rod, here not shown in detail, and on the other hand, via its hook 20 removably connected with yoke 24. The yoke 24, shown in FIGS. 3 and 4, has hook-shaped end parts 22 and 26, whose end part 22 is connectable with hook 20, whereas the end part 26, is hinged into pin 34 of the fastening member 13. The link 18 is mounted onto the fastening member 13 by way of a swiveling peg 33 and can be swiveled into the direction of the double arrow. The swiveling peg 33 is arranged at a certain distance of pin 34 so that the hose member 9, that juts out of pressure spring and is removably connectable with the fitting 30 above the fastening member 13, is neither in any pressure contact with the swiveling peg 33 nor with pin 34. The connection between the fitting 30 and the hose member 9 is established via a fastening member 35 that can be plugged both into the fastening member 30 and into the hose member 9. Washing liquid is provided to the fastening member 30 via a hollow wiper shaft.

The fastening member 13 has a conical relief 32 for fastening it on a wiper shaft and can be pivoted around the axis 31. Furthermore the fastening member 13 has a cap 12 Therefore the link 18 can make two independent movements, that is around axis 31 of the wiper shaft and around axis 7 of the swiveling peg 33. FIGS. 1 and 2 show that the fastening member 13 possesses only one horn 28, so that at the point where normally the other horn of the fastening member is positioned, the yoke 24, when tilting the link 18, can be guided around bearing point. The hose member 9 is not only centrally guided in the link 18 but also in the area which is defined by the fastening member 13 and the cap 12. This excludes a damage the hose.

FIGS. 3 and 4 show that yoke 24 consists of the end parts 22 and 26, between which the medium part 40 arranged. This concerns a multiply crimped yoke, whose medium part 40 show mid-section two sections 44 and 46. By means of the sections 44 and 46 and the end part 26 the mid-portion part 40 is laterally displaced with respect the hose member 9 and to a first plane passing through both end parts which is perpendicular to the pivot axis 7, whereas by means of the end parts 22 and 26 the mid-portion part 40 is displaced below the hose member 9 and lies within a fourth plane parallel and spaced from a third plane which passes through both end parts and is perpendicular to the first plane. It is recommendable to manufacture the yoke 24 from a wire.

I claim:

1. A wiper arm assembly comprising:
   a link member pivotally mounted about a pivot axis to a fastening member, said pivot axis having a first plane pass therethrough extending perpendicular to said pivot axis;
   said link member holding a hose for conveying washing liquid, said hose being positioned within a bore of a pressure spring,
   an elongated yoke having a mid-section and end parts, a first of said end parts connected to said pressure spring and a second of said end parts connected to said fastening member, said hose member extending out of the pressure spring and in the direction of said yoke, wherein said yoke mid-section is connected between both end parts, said end parts lying in said first plane and said mid-section having a portion thereof displaced from said first plane and from a second plane which is perpendicular to said plane and passes through both end parts.

2. A wiper arm assembly according to claim 1, wherein said mid-section of said yoke is bent and wherein said yoke has a first portion located between said first end and said mid-section, said first portion extending away from said first end and lying in said plane.

3. A wiper arm assembly according to claim 1 wherein said end parts are hook shaped.

4. A wiper arm assembly according to claim 1 wherein the hose member is connected to a fitting extending from said fastening member.

5. A wiper arm assembly according to claim 4 wherein said fitting is pivotally connected to said fastening member.

6. A wiper arm assembly accord to claim 5 wherein the connection between the yoke and the fastening member is established with a pin.

7. A wiper arm assembly according to claim 6 wherein the hose member is routed between said pin and said pivot axis.

8. A wiper arm assembly according to claim 7 wherein said link includes a longitudinal axis and said hose member extends generally parallel to said link.

9. A wiper arm assembly according to claim 8 wherein the fastening member has a single horn which is laterally attached thereto with respect to the longitudinal axis of the wiper arm assembly.

10. A wiper arm assembly according to claim 4 wherein the fitting can be connected with hose member by a plug-in connection.

11. A wiper arm assembly, comprising:
    an elongated yoke, a link member pivotally mounted to a fastening member for rotation about a pivot axis,
    a pressure spring, and
    a hose for washing liquid guided through a bore in said pressure spring, the yoke connecting the pressure spring with said fastening member, said yoke comprising a mid-portion and opposite end parts, wherein said end parts lie in a first plane which is perpendicular to said pivot axis and lie in a second plane which is perpendicular to said first plane, and said mid-portion is located between said end parts and is bent such that it has a portion lying in third and fourth planes, wherein said first and third planes are spaced apart and generally parallel and said second and fourth planes are spaced apart and generally parallel.

12. A wiper arm assembly comprising:
    a link member pivotally mounted about a pivot axis to a fastening member, said link member having a longitudinal axis;
    a pressure spring having opposed ends interconnected between said fastening member and said link member for applying pressure to said wiper arm assembly;
    a hose for conveying fluid, said hose being received within a bore in said pressure spring;
    an elongated yoke having two ends, with one end connected to said pressure spring and one end connected to said fastening member, an intermediate portion of said yoke being bent laterally and longitudinally with respect to said longitudinal axis of said link member such that said ends lie in a first plane extending perpendicular to said pivot axis, and lie in a second plane extending perpendicular to said first plane, and said intermediate portion lies in a third plane extending perpendicular to said pivot axis and spaced from said first plane and lies in a fourth plane which is parallel to and spaced from said second plane,
    whereby said yoke does not interfere with said hose during movement of said link member.

13. The wiper arm assembly of claim 12, wherein said link member includes side walls extending from a top wall, said side and top walls defining an opening, wherein said yoke is concealed within said opening of said link member.

* * * * *